(12) United States Patent
Mizuta

(10) Patent No.: US 6,170,841 B1
(45) Date of Patent: Jan. 9, 2001

(54) STEERING SYSTEM FOR STRADDLE TYPE FOUR-WHEELED ALL-TERRAIN VEHICLE

(75) Inventor: Fumio Mizuta, Akashi (JP)

(73) Assignee: Kawasaki Jukogyo Kabushiki Kaisha, Kobe (JP)

( * ) Notice: Under 35 U.S.C. 154(b), the term of this patent shall be extended for 0 days.

(21) Appl. No.: 09/174,411

(22) Filed: Oct. 19, 1998

(30) Foreign Application Priority Data

Nov. 26, 1997 (JP) .................................................. 9-324220

(51) Int. Cl.[7] ...................................................... B62D 1/16
(52) U.S. Cl. ............................................. 280/89; 280/271
(58) Field of Search .................................. 280/271, 272, 280/89, 89.1, 89.11; 180/219

(56) References Cited

U.S. PATENT DOCUMENTS

| | | | |
|---|---|---|---|
| 582,279 | * 5/1897 | Gold | 280/272 |
| 905,912 | * 12/1908 | Nehring | 280/89 |
| 923,583 | * 6/1909 | Ross | 280/89.1 |
| 1,234,748 | * 7/1917 | Gaines | 280/89 |
| 1,438,042 | * 12/1922 | Kincaid | 280/89 |
| 1,610,057 | * 12/1926 | Humphrey | 280/89 |
| 1,775,624 | * 9/1930 | Shutts | 280/89.1 |
| 4,700,963 | * 10/1987 | Burns et al. | 280/276 |
| 4,861,052 | * 8/1989 | Hediger | 280/87.043 |

FOREIGN PATENT DOCUMENTS

299964 * 11/1928 (GB) ........................................ 280/89
61-196887 12/1985 (JP) .

* cited by examiner

Primary Examiner—Daniel G. DePumpo
Assistant Examiner—Michael Cuff
(74) Attorney, Agent, or Firm—Oliff & Berridge, PLC

(57) ABSTRACT

A steering system for a straddle type four-wheeled all terrain vehicle comprises a steering shaft, a first stopping mechanism combined with a lower end part of the steering shaft, and a second stopping mechanism combined with an upper end of the steering shaft. The first stopping mechanism comprises a first shaft-side stopper including a base plate welded to a part of the steering shaft near the lower end of the steering shaft so that the opposite side parts thereof project on the right and the left side of the steering shaft, and adjusting bolts fixed to the opposite side parts of the base plate, and a first frame-side stopper attached to a body frame of the vehicle and provided with a stopping projection. The second stopping mechanism comprises a second shaft-side stopper similar to the first and a second frame-side stopper including an upper bracket fixed to the frame of the all-terrain vehicle. When the steering shaft is turned in either direction, the adjusting bolt of the first and second stoppers comes into contact with the stopping projections of the respective frame-side stoppers to limit the turning of the steering shaft. Thus, the turning of the steering shaft relative to the body frame is limited to a predetermined angular turning range.

8 Claims, 8 Drawing Sheets

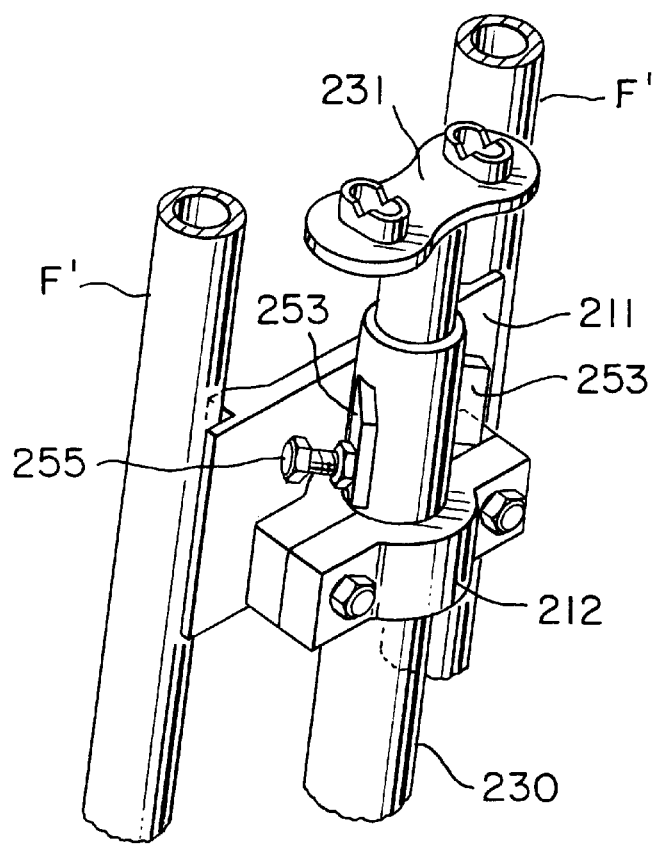
FIG. 12
(RELATED ART)
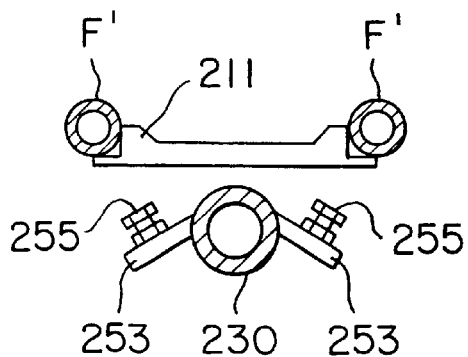 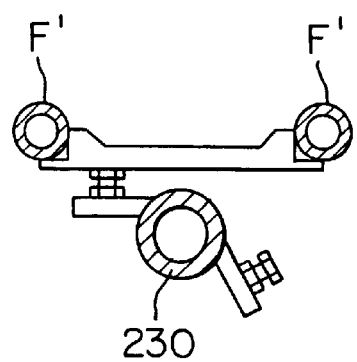
FIG. 13A
(RELATED ART)
FIG. 13B
(RELATED ART)

STEERING SYSTEM FOR STRADDLE TYPE FOUR-WHEELED ALL-TERRAIN VEHICLE

BACKGROUND OF THE INVENTION

1. Field of the Invention

The present invention relates to a steering system for a straddle type four-wheeled all-terrain vehicle (hereinafter abbreviated to "ATV") and, more specifically, to a steering system capable of limiting the turning of a steering shaft to a predetermined angular turning range.

2. Description of the Related Art

The ATV is capable of traveling rough terrains including sandy places, rugged lands, rocky mountains and rough lands with muddy puddles. A steering shaft is supported for rotation on a body frame of the ATV, and a handlebar is connected to the upper end of the steering shaft. The driver operates the handlebar to steer the ATV. The steering shaft is linked to a wheel support system supporting wheels by a linkage. When the handlebar is operated by the driver, the direction of the wheels is changed for steering. The turning of the steering shaft of the ATV is limited to a predetermined angular turning range by a stopping mechanism similar to a known handlebar stopping mechanism employed in a motorcycle.

Referring to FIGS. 10 and 11 illustrating a handlebar turning angular turning range adjusting mechanism for a motorcycle, disclosed in JP-A No. 61-196887 (Utility Model), a handlebar 132 is fixedly joined to a lower fork bracket 121, and stoppers 122 project from the upper surface of the lower fork bracket 121. A head pipe 130 is fixed to a body frame, and a bracket 154 is fixed to the outer side surface of the head pipe 130. Stopper bolts 155 are attached to stopper bolt holders 156 fixed to the bracket 154. When the handlebar 132 is turned on the head pipe 130 by the driver, the lower fork bracket 121 is turned. The handlebar 132 cannot be turned beyond a position where the stopper 122 comes into contact with the stopper bolt 155. In the motorcycle, the handlebar stopping mechanism is disposed at an upper position near the handlebar to make the handlebar stopping mechanism rigid against force exerted thereon by the handlebar so that the driver is able to recognize the turn of the handlebar to a limit position from the unyielding collision of the stopper bolt 155 against the stopper 122. The steering shaft of the ATV is combined with a handlebar stopping mechanism similar in principle to the foregoing handlebar stopping mechanism for a motorcycle.

Referring to FIG. 12 showing a handlebar stopping mechanism employed in a conventional ATV, a handlebar bracket 231 is joined to the upper end of a steering shaft 230. A handlebar is attached to the handlebar bracket 231. A stopper 253 provided with a bolt 255 is welded to a side surface of an upper part of the steering shaft 230. An upper bracket 211 is connected to a body frame F. When the steering shaft 230 is turned to a predetermined angular position, the bolt 255 of the stopper 253 collides with the bracket 211. An upper bearing unit 212 is attached to the bracket 211 to support the steering shaft 230 for turning. The stopper 253 provided with the bolt 255 is attached to a part of the steering shaft 230 extending upward from the upper bearing unit 212. FIGS. 13A and 13B show the positional relation between the stopper 253 and the bracket 211 when the handlebar is held at a position for straight forward traveling and when the handlebar is turned substantially fully to the right, respectively. The turning of the steering shaft 230 in either direction is limited by the collision of the head of the adjusting bolt 255 with the bracket 211 to limit the turning of the steering shaft 230 to a predetermined angular turning range.

Thus, the handlebar stopping mechanism employed in the ATV, similarly to that employed in a motorcycle, is disposed at an upper position near the handlebar to make the handlebar stopping mechanism rigid against force exerted thereon by the handlebar so that the driver is able to recognize the turn of the handlebar to a limit position from the unyielding collision of the head of the bolt of the stopper against the bracket.

Sometimes intensive shocks that force the direction of the wheels to change suddenly act on the wheels because the ATV travels rough terrains. Those shocks exerted on the wheels are born through a linkage linking a wheel support mechanism and the steering shaft 230 by the stopper attached to the upper part of the steering shaft 230. The linkage is connected to a lower part of the steering shaft 230 apart from the upper part of the same. Since the stopper is distant from a position on which the shocks are exerted, the steering shaft 230 must be highly rigid and hence the steering shaft 230 is inevitably heavy.

SUMMARY OF THE INVENTION

Accordingly, it is an object of the present invention to provide a lightweight, simple steering system for an ATV.

According to one aspect of the present invention, a steering system comprises: a steering shaft supported for turning on a body frame; a handlebar connected to an upper end part of the steering shaft; linkages linking the steering shaft and wheel support mechanisms so that the direction of wheels supported on the wheel support mechanisms is changed when the handlebar is operated. In this steering system, a first shaft-side stopper is disposed on the steering shaft at a position near a part of the same connected to the linkages, a first frame-side stopper is disposed on the body frame at a position corresponding to the first shaft-side stopper, and the turning of the steering shaft relative to the body frame is limited to a predetermined angular turning range by the engagement of the first shaft-side stopper with the first frame-side stopper.

According to the present invention, the first shaft-side stopper is disposed on the steering shaft at a position near the part of the same connected to the linkages to bear shocks exerted on the wheels by the first shaft-side stopper. Accordingly, the steering shaft is not twisted greatly by a torsional moment produced by external shocks, and a section of the steering shaft between a position where external shocks are exerted on the steering shaft and a position where the shaft-side stopper is attached to the steering shaft is short, and therefore the section of the steering shaft has a high torsional rigidity. Consequently, the steering shaft and the associated parts may be of a lightweight construction.

Preferably, the linkages are connected to a lower part of the steering shaft, and the first shaft-side stopper is disposed near the lower end of the steering shaft to construct the steering system in a particularly strong construction.

Preferably, the body frame is provided with a lower bearing unit for supporting the steering shaft at its lower end part, and the lower bearing unit is provided integrally with the first frame-side stopper. The lower bearing unit serving as both a bearing unit and a frame-side stopper reduces the number of component parts and the manufacturing cost of the steering system.

The first shaft-side stopper and the first frame-side stopper can be embodied in various shapes. The first shaft-side stopper may be formed in a shape having projecting parts projecting on the right and the left side of the steering shaft, and the first frame-side stopper may be disposed on the front side of the steering shaft.

The steering shaft may be provided further with a second shaft-side stopper at a position near its upper end, the body frame may be provided further with a second frame-side stopper at a position corresponding to the second shaft-side stopper, the angular position of the steering shaft relative to the body frame when the second shaft-side stopper is in contact with the second frame-side stopper may be substantially the same as that of the steering shaft relative to the body frame when the first shaft-side stopper is in contact with the first frame-side stopper. The steering shaft will not be twisted even if a large torque is applied to the steering shaft by the driver's turning of the handlebar. Accordingly, the collision of the shaft-side stoppers with the corresponding frame-side stoppers can exactly be sensed by the driver. In addition, the first shaft-side stopper and the first frame-side stopper prevent a twist of the steering shaft by the wheels. Thus, when the handlebar is turned fully to the right or the left, the collision of the second shaft-side stopper with the corresponding second frame-side stopper can directly be sensed by the driver, and the steering system can sufficiently bear the external shocks exerted on the wheels by the first shaft-side stopper and the first frame-side stopper. The steering system will be enhanced when the steering system is provided with the second shaft-side stopper and the second frame-side stopper in addition to the first shaft-side stopper and the first frame-side stopper.

BRIEF DESCRIPTION OF THE DRAWINGS

The above and other objects, features and advantages of the present invention will become more apparent from the following description taken in connection with the accompanying drawings, in which:

FIG. 12 is a perspective view of a conventional handlebar stopping mechanism employed in an ATV; and FIGS. 13A and 13B are sectional views of a steering shaft shown in FIG. 12.

DESCRIPTION OF THE PREFERRED EMBODIMENTS

Figure 1:
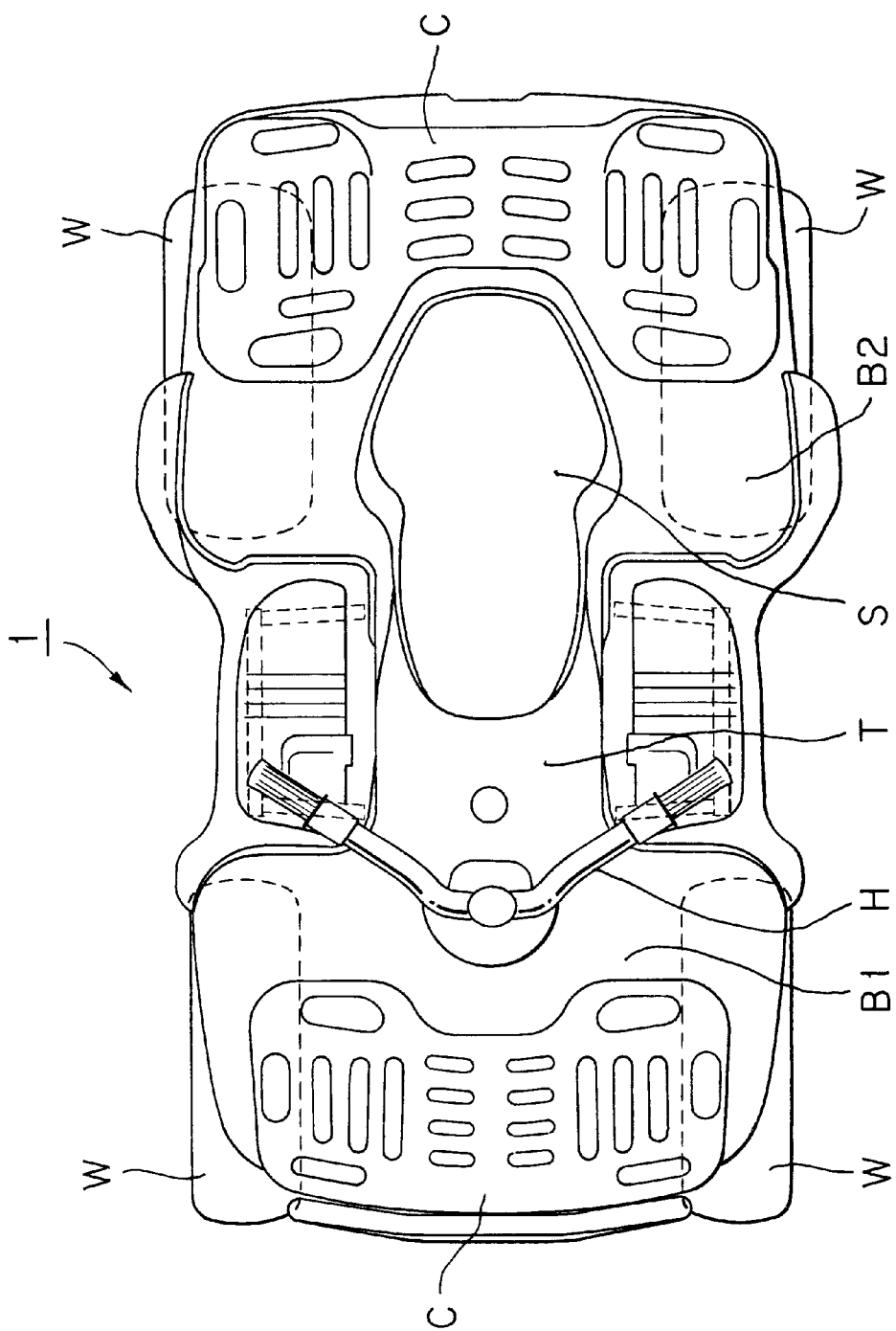
FIG. 1 is a plan view of an ATV employing a steering system according to the present invention.
Figure 2:
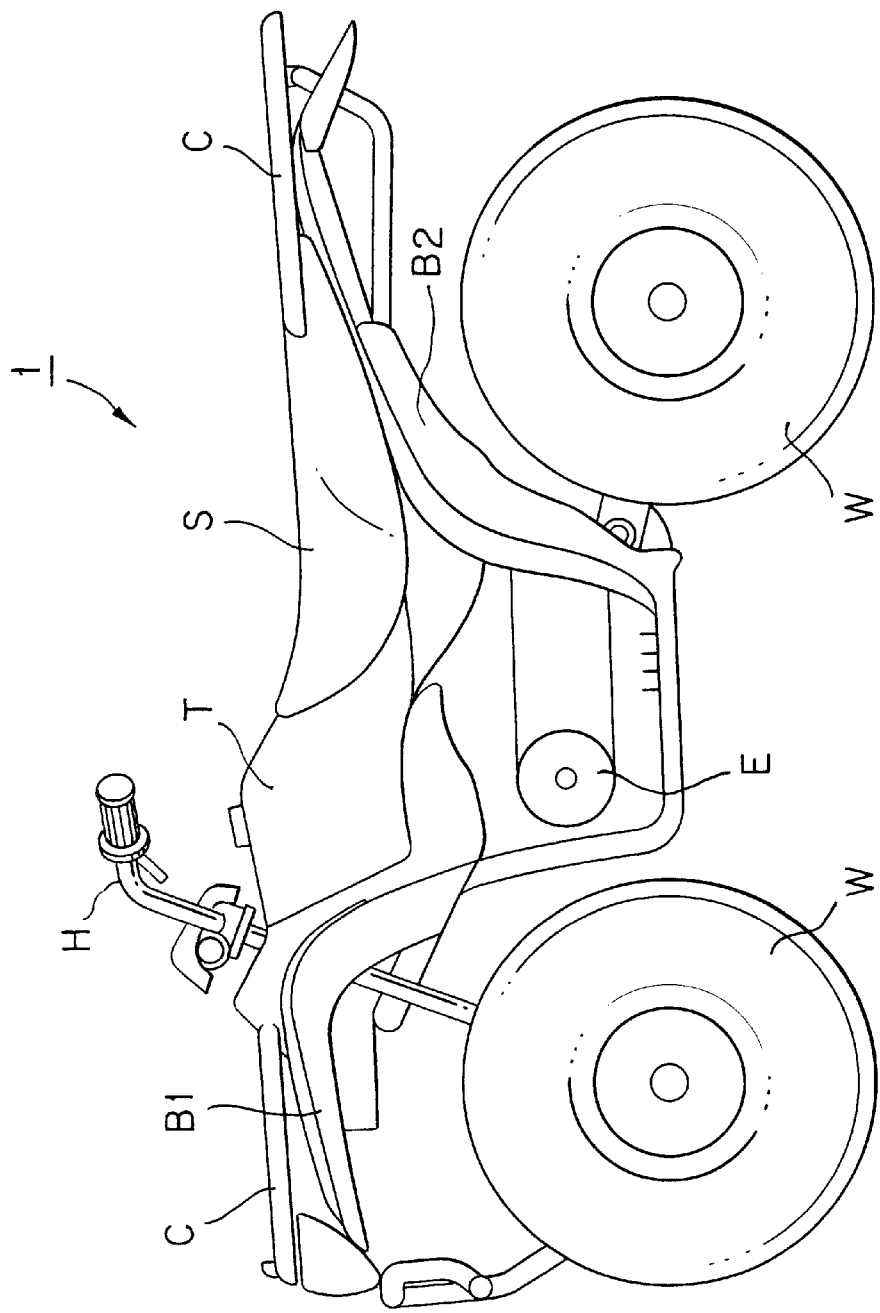
FIG. 2 is a side view of the ATV of FIG. 1.
Figure 3:
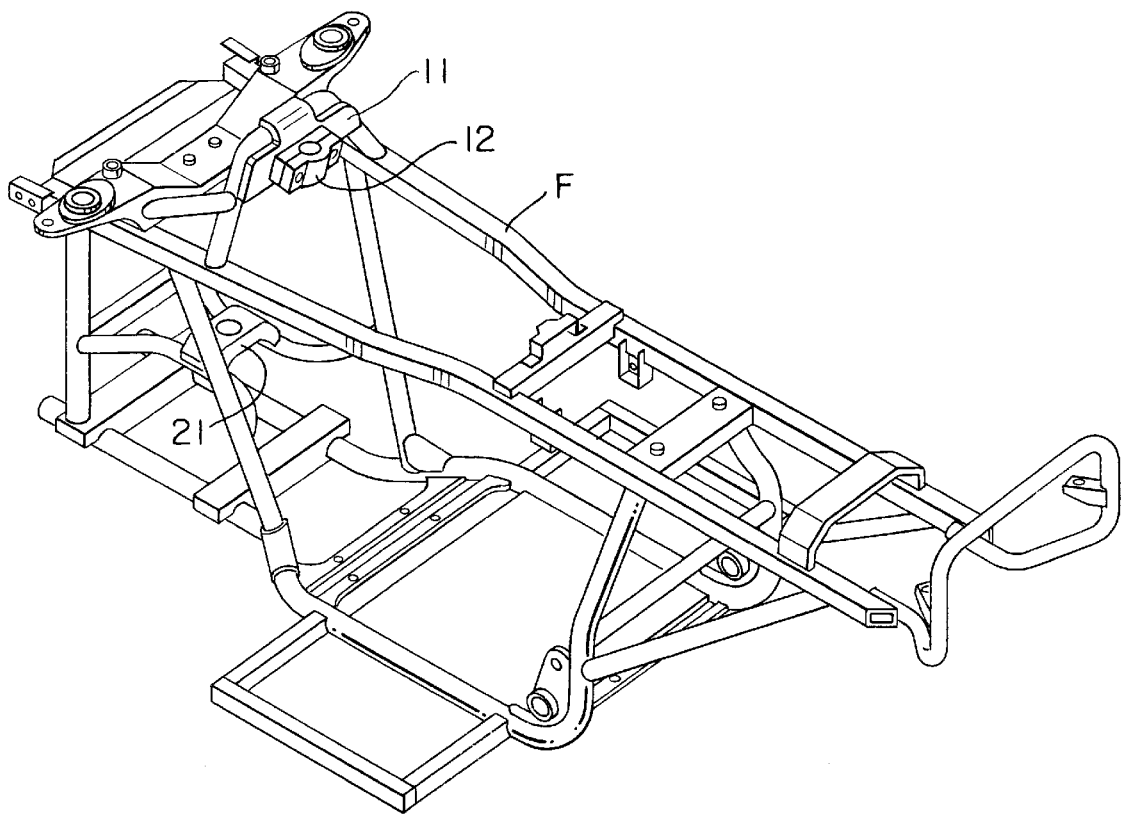
FIG. 3 is a perspective view of a body frame included in the ATV of FIG. 1.

FIG. 1 is a plan view of an ATV 1 employing a steering system according to the present invention, FIG. 2 is a side view of the ATV 1 of FIG. 1, and FIG. 3 is a perspective view of a body frame F included in the ATV 1 of FIG. 1.

Referring to FIGS. 1 and 2, a driving system including an engine E, a transmission (not shown) and such, a battery, a fuel tank T and a seat S are mounted on the body frame F, wheels W are suspended from the body frame F, and a handlebar H is supported on the body frame F. The front and the rear wheels W are covered with a front fender B1 and a rear fender B2, respectively. Baggage carriers C are disposed over the fenders B1 and B2, respectively. As shown in FIG. 3, an upper bracket 11 is fixed to an upper part of a front section of the body frame F, and an upper bearing unit 12 is fixed to the upper bracket 11. A lower bracket 21 is fixed to members of the body frame F in a lower section of the body frame F, and a lower bearing unit (not shown) is fixed to the lower bracket 21. A steering shaft 30 is supported for rotation on the body frame F by the upper bearing unit 12 and the lower bearing unit.

Figure 4:
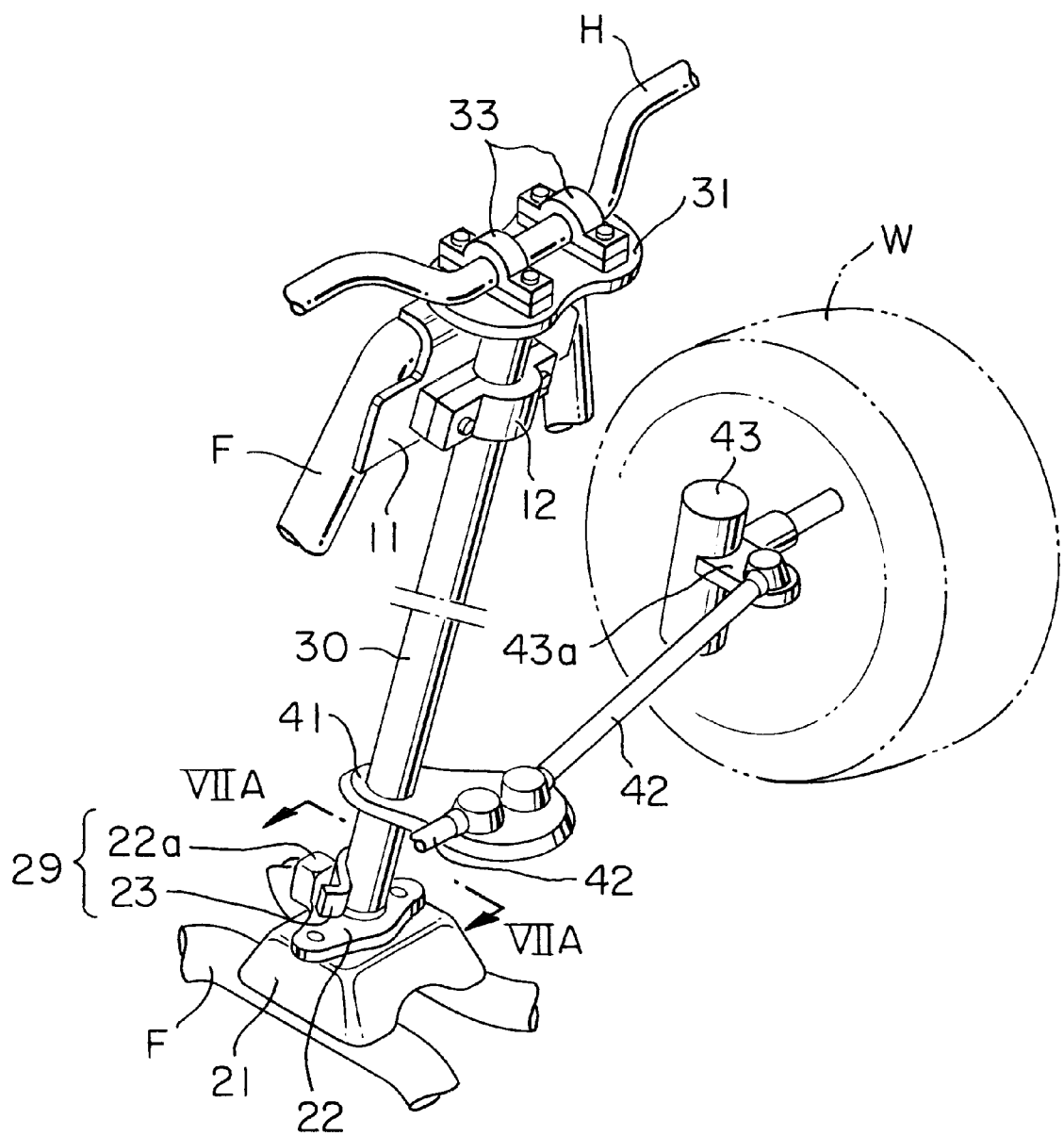
FIG. 4 is a perspective view of a steering system in a first embodiment according to the present invention.

Referring to FIG. 4, an upper part of the steering shaft 30 is supported in the upper bearing unit 12, and a lower end part of the steering shaft 30 is supported in the lower bearing unit 22. A handlebar bracket 31 is attached to the upper end of the steering shaft 30, and a handlebar H is fastened to the handlebar bracket 31 by fastening members 33.

Figure 5:
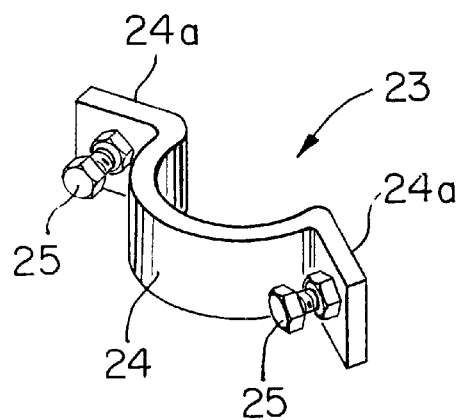
FIG. 5 is a perspective view of a first shaft-side stopper.
Figure 6:
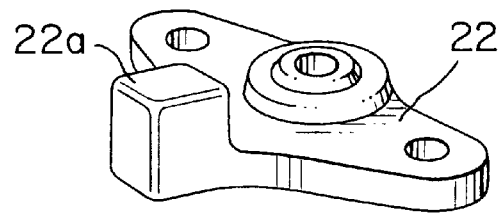
FIG. 6 is a perspective view of a lower bearing unit.

Referring to FIG. 5, a first shaft-side stopper 23 has a base member 24 having projections 24a at its opposite ends, and two adjusting bolts 25 fastened to the projections 24a. The base member 24 as shown in FIG. 5 is welded to a lower end part of the steering shaft 30 as shown in FIG. 4. When the base member 24 is welded to the steering shaft 30, the projections 24a project on the right and the left side, respectively, of the steering shaft 30. As shown in FIG. 4, a first frame-side stopper 22a is formed integrally with the lower bearing unit 22. As shown in FIG. 6, the first frame-side stopper 22a is formed integrally with the lower bearing unit 22 so as to project upward from the lower bearing unit 22 in order to reduce the number of component parts and the manufacturing cost of the steering system. The first frame-side stopper 22a may be a separate part fastened to the lower bearing unit 22 or to the body frame F. The turning of the steering shaft 30 is limited to a predetermined angular turning range defined by the cooperative actions of the first shaft-side stopper 23 and the first frame-side stopper 22a. The first shaft-side stopper 23 and the first frame-side stopper 22a constitute a first handlebar stopping mechanism 29.

Figure 7A:
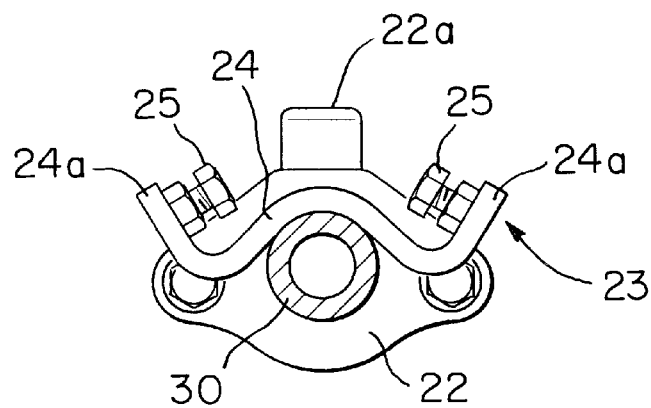
FIGS. 7A and 7B are sectional views taken on line VIIA—VIIA in FIG. 4.
Figure 7B:
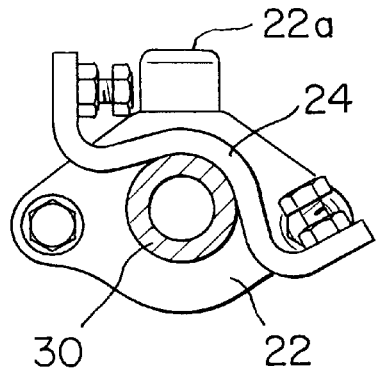

FIG. 7A shows the positional relation between the first shaft-side stopper 23 and the first frame-side stopper 22a in a state where the handlebar H is at its neutral position, and FIG. 7B shows the positional relation between the first shaft-side stopper 23 and the first frame-side stopper 22a in a state where the handlebar H is turned substantially fully to the right, i.e., clockwise as viewed in FIG. 7B. Turning of the steering shaft 30 in either a clockwise direction or a counterclockwise direction is limited by the contact of the head of one of the adjusting bolts 25 with the first frame-side stopper 22a. Thus, the steering shaft 30 is able to turn in a predetermined angular turning range. The angular turning range for the turning of the steering shaft 30 can be adjusted by adjusting the height of the head of each adjusting bolt 25 from the surface of the corresponding projection 24a of the base member 24; the greater the height of the head of the adjusting bolt 25 from the surface of the corresponding projection 24a, the narrower is the angular turning range for the turning of the steering shaft 30.

Referring again to FIG. 4, a center arm 41 is welded to a lower part of the steering shaft 30. A tie rod 42 has one end pivotally joined to the center arm 41, and the other end pivotally joined to an arm 43a of a wheel support member 43 supporting the front wheel W. The center arm 41, the tie rod 42 and the arm 43a constitute a linkage. The linkage is connected to the steering shaft 30 by welding the center arm 41 to the steering shaft 30. Turning motion of the handlebar H is transmitted through the linkage to the front wheel W to change the direction of the front wheel W. Although only the right front wheel W and the linkage linking the right front wheel W to the steering shaft 30 are shown in FIG. 4, the left front wheel W is linked to the steering shaft 30 by a linkage similar to that shown in FIG. 4.

If external shocks are exerted on the front wheels W with the handlebar H turned fully clockwise or counterclockwise while the ATV 1 is traveling, the external shocks transmitted through the linkages to the steering shaft 30 are born by the first frame-side stopper 22a. Therefore, a torsional moment is exerted on a short section of the steering shaft 30 between a part of the steering shaft 30 to which the center arm 41 is welded and a part of the same to which the base member 24 of the first shaft-side stopper 23 is welded, and the torsional moment produced by the external shocks acts scarcely on an upper section of the steering shaft 30 extending upward from the part to which the center arm 41 is welded.

Figure 8:
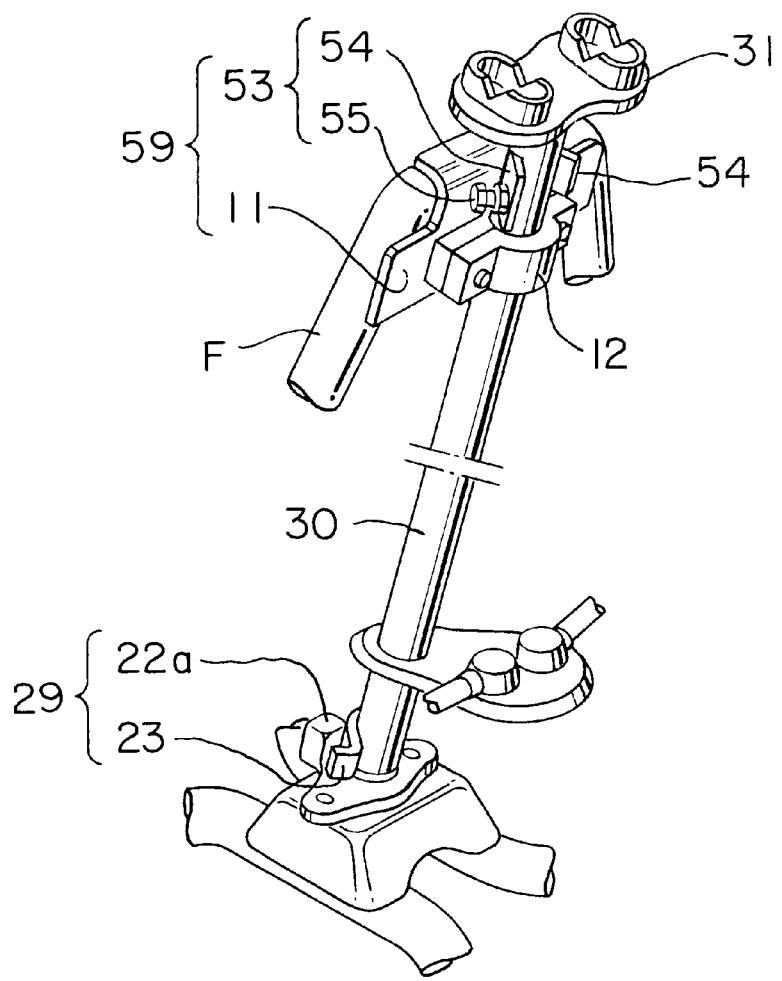
FIG. 8 is a perspective view of a steering system in a second embodiment according to the present invention.

Referring to FIG. 8 showing a steering system in a second embodiment according to the present invention for an ATV, a first handlebar stopping mechanism 29 similar to that shown in FIG. 4 is connected to a lower part of a steering shaft 30, and a second handlebar stopping mechanism 59 is connected to an upper part of the steering shaft 30. A handlebar (not shown) is attached to the upper end of the steering shaft 30. The second handlebar stopping mechanism 59 comprises a second shaft-side stopper 53 having a pair of base plates 54 welded to a right side surface and a left side surface, respectively, of an upper section of the steering shaft 30, and adjusting bolts 55 fixed to the base plates 54, and a second frame-side stopper. In this embodiment, the second frame-side stopper is an upper bracket 11 fixed to an upper part of a front section of a body frame F of the ATV. Turning of the steering shaft 30 in either direction is limited by the contact of the head of the adjusting bolt 55 with the upper bracket 11, so that the steering shaft 30 is able to turn only in a predetermined angular turning range.

Figure 9A:
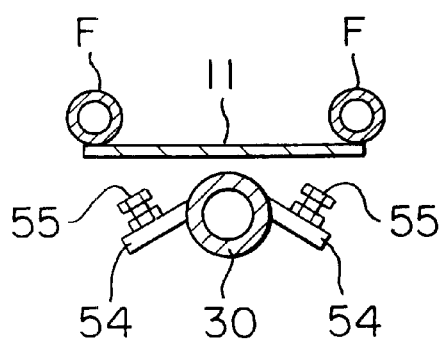
FIGS. 9A and 9B are sectional views of a steering shaft included in the steering system of FIG. 8.
Figure 9B:
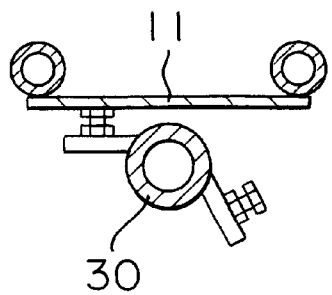
Figure 10:
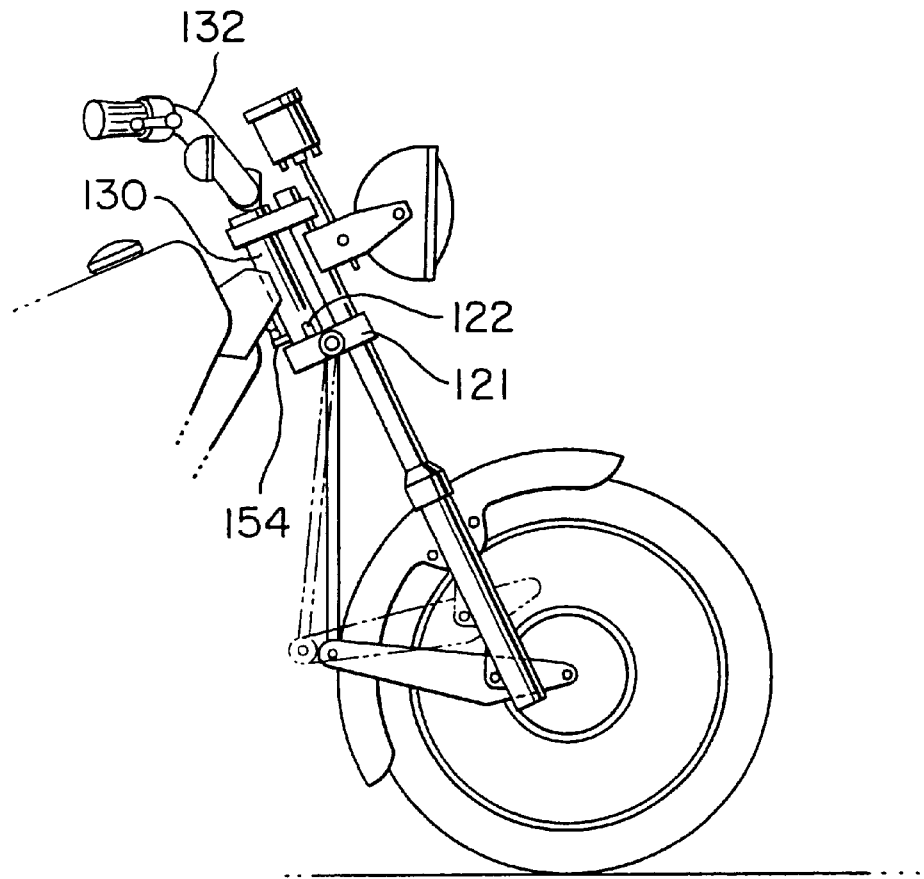
FIG. 10 is a fragmentary side view of a motorcycle.
Figure 11:
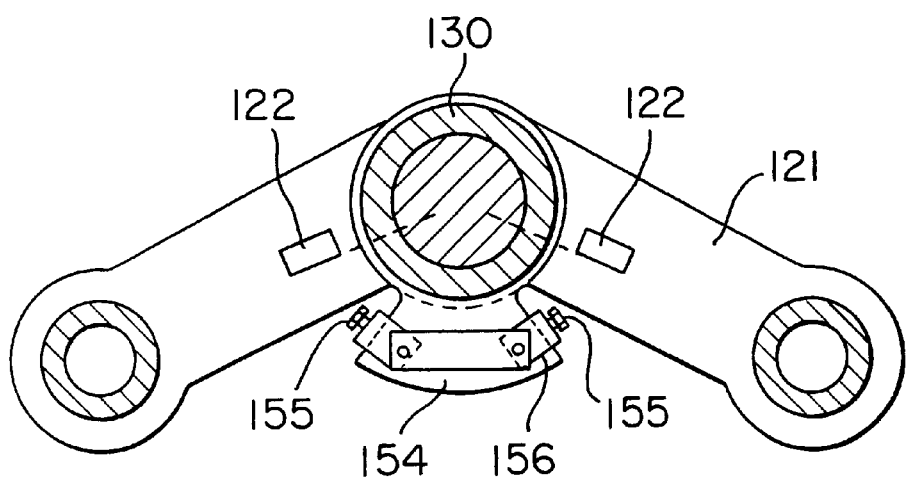
FIG. 11 is a plan view of a steering angle adjusting mechanism included in a motorcycle.

FIG. 9A shows the positional relation between the second shaft-side stopper 53 and the upper bracket 11, i.e., the second frame-side stopper in a state where the handlebar H is at its neutral position, and FIG. 9B shows the positional relation between the second shaft-side stopper 53 and the upper bracket 11 in a state where the handlebar is turned substantially fully clockwise. Turning of the steering shaft 30 in either a clockwise direction or a counterclockwise direction is limited by the contact of the head of one of the adjusting bolts 55 with the upper bracket 11. Thus, the second handlebar stopping mechanism 59 also defines a predetermined angular turning range for the turning of the steering shaft 30. The angular turning range for the turning of the steering shaft 30 can be adjusted by adjusting the height of the head of each adjusting bolt 55 from the surface of the corresponding base plat 54; the greater the height of the head of the adjusting bolt 55 from the surface of the corresponding base plate 54, the narrower is the angular turning range for the turning of the steering shaft 30.

When the second handlebar stopping mechanism 59 is thus combined with the upper part of the steering shaft in addition to combining the first handlebar stopping mechanism 29 to the lower part of the steering shaft 30, the second handlebar stopping mechanism 59 gives the driver an exact feeling of contact between the adjusting bolt 55 and the upper bracket 11 when the handlebar is turned fully in either a clockwise direction or a counterclockwise direction, and the first handlebar stopping mechanism 29 bears shocks transmitted from the wheels to the steering shaft 30. Therefore, the steering shaft 30 need not have a high rigidity and may be of a lightweight construction. A torque exerted by the driver on the handlebar is born by the second handlebar stopping mechanism 59 and hence any torsional moment resulting from the torque exerted by the driver on the handlebar is not exerted on a section of the steering shaft 30 extending down from the part to which the base plates 54 are welded.

The first handlebar stopping mechanism 29 and the second handlebar stopping mechanism 59 are adjusted so that the first handlebar stopping mechanism 29 and the second handlebar stopping mechanism 59 define substantially the same angular turning range. In other words, the first handlebar stopping mechanism 29 and the second handlebar stopping mechanism 59 may be constructed such that the second shaft-side stopper 53 can substantially be in contact with the upper bracket 11 when the handlebar H is turned to come into contact with the first shaft-side stopper 23 with the first frame-side stopper 22a.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A steering system for a straddle type four-wheeled all-terrain vehicle, comprising:
    a steering shaft supported for turning on a body frame having a lower bearing unit;
    a handlebar connected to an upper end part of the steering shaft;
    linkages linking the steering shaft to wheel support mechanisms so that the direction of wheels supported on the wheel support mechanisms is changed when the handlebar is operated;
    a first shaft-side stopper attached to a part of the steering shaft near a part of the same connected to the linkages;
    a first frame-side stopper integral with the lower bearing unit attached to the body frame at a position corresponding to the first shaft-side stopper;
    a second shaft-side stopper attached to an upper section of the steering shaft near the handlebar at substantially opposite sides of the steering shaft; and
    a second frame-side stopper attached to the body frame at a position corresponding to the second shaft-side stopper,
    wherein the turning of the steering shaft relative to the body frame is limited to a predetermined angular turning range by the engagement of the first shaft-side stopper with the first frame-side stopper, and the engagement of the second shaft-side stopper with the second frame-side stopper.

2. The steering system according to claim 1, wherein the linkages are connected to a lower part of the steering shaft, and the first shaft-side stopper is disposed near the lower end of the steering shaft.

3. The steering system according to claim 2, wherein the body frame is provided with a lower bearing unit for supporting the steering shaft at its lower end part, and the lower bearing unit is provided integrally with the first frame-side stopper.

4. The steering system according to claim 2, wherein the first shaft-side stopper is formed in a shape having projecting parts projecting on the right and the left side of the steering shaft, respectively, and the first frame-side stopper is disposed on the front side of the steering shaft.

5. The steering system according to claim 2, wherein the first shaft-side stopper comprises a base member having projections at its opposite ends, and a pair of adjusting bolts fastened to the projections of the base member, respectively, so that the height of the head of each adjusting bolt from the surface of the corresponding projection of the base member is adjustable.

6. The steering system according to claim 1,
wherein the angular position of the steering shaft relative to the body frame when the second shaft-side stopper is in contact with the second frame-side stopper is substantially the same as that of the steering shaft relative to the body frame when the first shaft-side stopper is in contact with the first frame-side stopper.

7. The steering system according to claim 6, wherein the second shaft-side stopper comprises a pair of base plates fixed to a right side surface and a left side surface, respectively, of an upper section of the steering shaft, and a pair of adjusting bolts fixed to the base plates so that the height of the head of each of the pair of adjusting bolts from a surface of the corresponding base plate is adjustable.

8. The steering system according to claim 7, wherein the first shaft-side stopper comprises a base member having projections at its opposite ends, and a pair of adjusting bolts fastened to the projections of the base member, respectively, so that the height of the head of each adjusting bolt from the surface of the corresponding projection of the base member is adjustable.

* * * * *